United States Patent [19]

Broad

[11] 4,214,991
[45] Jul. 29, 1980

[54] TUBE PRESSURE FILTERS

[75] Inventor: Bernard H. Broad, St. Austell, England

[73] Assignee: English Clays Lovering Pochin & Company, Limited, St. Austell, England

[21] Appl. No.: 970,974

[22] Filed: Dec. 19, 1978

[30] Foreign Application Priority Data

Dec. 19, 1977 [GB] United Kingdom ............... 52808/77

[51] Int. Cl.² ...................... B01D 29/10; B01D 35/00
[52] U.S. Cl. ..................................... 210/232; 210/350
[58] Field of Search ............... 210/350, 497 R, 323 T, 210/232, 457, 458; 55/378, 374

[56] References Cited

U.S. PATENT DOCUMENTS

| 3,753,498 | 8/1973 | Gwilliam ............................. 210/350 |
| 4,015,961 | 4/1977 | Howard et al. ...................... 55/378 |

*Primary Examiner*—Frank Sever
*Attorney, Agent, or Firm*—Weingram & Klauber

[57] ABSTRACT

In a tube pressure filter which includes a pair of generally coaxial inner and outer tubular bodies arranged one within the other and adapted to be supported in a generally upright position, the inner tubular body having a cylindrical central section, and upper and lower end sections, each of which end sections includes a portion of greater diameter than the cylindrical central section and a fairing mounted on or adjacent to said portion so as to extend around an end of the cylindrical central section; and a filter element disposed around and supported by the inner tubular body, the filter element comprising a filter cloth sleeve, the improvement which comprises constructing the fairings and the ends of the filter cloth sleeve so that each end of the filter cloth sleeve is or can be secured to the outwardly facing surface of one of said fairings.

4 Claims, 3 Drawing Figures

FIG./.

TUBE PRESSURE FILTERS

BACKGROUND OF THE INVENTION

This invention relates to pressure filters and, more particularly, is concerned with tube pressure filters.

In recent years there have been developed a type of pressure filter, conveniently called tube pressure filters, which are capable of operating at high pressures, for example pressures in excess of about 1000 lbs/in$^2$, and which can be used to separate particulate solids and liquids which are not separable to the same extent by conventional plate filter presses. Various kinds of tube pressure filter have been described, see for example British Patent Specifications Nos. 907,485; 1,194,676; 1,240,465 and 1,271,494. One kind of tube pressure filter essentially comprises (a) a pair of generally coaxial inner and outer tubular bodies arranged one within the other and adapted to be supported in a generally upright position, (b) an impermeable elastic sleeve disposed within and secured to the outer tubular body, (c) a filter element disposed around and supported by the inner tubular body, (d) first outlet means whereby filtrate which has passed through the filter element can be discharged from the tube pressure filter, and (e) second outlet means whereby solid retained on said filter element can be discharged from the pressure filter, the arrangement being such that in a first operating condition of the tube pressure filter said second outlet means is closed and the tubular bodies cooperate with each other to define a closed annular chamber which is divided into generally coaxial and non-intercommunicating inner and outer compartments by said impermeable elastic sleeve, the inner compartment having an inlet for feed material (comprising a mixture of a liquid and a particulate solid) and the outer compartment having an inlet for a hydraulic fluid under pressure, and in a second operating condition of the tube pressure filter said second outlet means is open to enable the particulate solid to be discharged from the inner compartment. Generally, this kind of tube pressure filter includes means for displacing the tubular bodies axially relative to one another between their first and second operating conditions whereby the inner compartment of said annular chamber is opened, i.e. the second outlet means is opened, so that the filter cake of particulate solid formed on the filter element can be discharged.

The inner tubular body and the filter element supported thereby are constructed and arranged so that, in use, when the tubular bodies are in their first position, liquid from the feed material can be forced through the filter element and through apertures in the inner tubular body while the particulate solid of said feed material is retained on the filter element, the liquid being forced through the filter element by the introduction of a hydraulic fluid under pressure into the outer compartment which hydraulic fluid urges the impermeable elastic sleeve towards the filter element so as to compress the particulate solid in the inner compartment and express liquid therefrom; and when the tubular bodies are in their second position, the chamber of annular cross-section is open and said particulate solid can be discharged from the inner compartment. The filter element of a tube pressure filter usually comprises a sleeve formed from a filter cloth material, advantageously supported on a wire mesh screen which is arranged around the inner tubular body of the tube pressure filter. The inner one of said pair of generally coaxial tubular bodies usually comprises a cylindrical central section, around which cylindrical central section there is disposed and supported the filter element, and upper and lower end sections secured one to each end of said cylindrical central section, each of which end sections includes a portion (which generally cooperates with the adjacent portion of the outer tubular body to form the closed annular chamber when said tubular bodies are in their first operating condition) which is of greater diameter than said cylindrical central section, and each of which end sections has mounted thereon, either on or adjacent to the portion of greater diameter than the cylindrical central section, a fairing which extends around an end of the filter element. Each fairing constitutes means whereby a gradual change of diameter occurs from said portion of greater diameter than the central section to said cylindrical central section, i.e. the outwardly facing surface of the fairing slopes inwardly from the rim of said portion of greater diameter than the central section to said central section. The outwardly facing surface of the fairing can be linear or curved, in the latter case with either a concave or convex profile.

As previously mentioned, in most tube pressure filters the filter element comprises a filter cloth sleeve which fits closely over the inner tubular body. Generally, the filter cloth sleeve is constructed, or tailored, to a shape and size enabling it to be directly fitted without further alteration as a replacement for a filter cloth sleeve which has been damaged or whose interstices have been blocked by solid particles. With some forms of tube pressure filter the fitting (sometimes known as the dressing) of the filter element is rendered more difficult by the fact that the end sections of the inner tubular body have a significantly larger diameter than the cylindrical central section which supports the filter cloth sleeve, so that at least one of the end sections of the inner tubular body has to be removed, with the consequential expenditure of time and effort.

SUMMARY OF THE INVENTION

According to the present invention there is provided, in a tube pressure filter of the kind which comprises (a) a pair of generally coaxial inner and outer tubular bodies arranged one within the other and adapted to be supported in a generally upright position, the inner tubular body including a cylindrical central section, and upper and lower end sections, each of which end sections includes a portion of greater diameter than the cylindrical central section and a fairing mounted on or adjacent to said portion so as to extend around an end of the cylindrical central section, (b) an impermeable elastic sleeve disposed within and secured to the outer tubular body, (c) a filter element disposed around and supported by the inner tubular body, the filter element comprising a filter cloth sleeve, (d) first outlet means for the discharge from the interior of the inner tubular body of filtrate which has passed through the filter element and through apertures in the inner tubular body, (e) second outlet means for the discharge from the tube pressure filter of particulate solid, and (f) means for displacing the tubular bodies axially relative to one another between a first position and a second position; the arrangement being such that in the first position of said tubular bodies they cooperate with each other to define a closed chamber of annular cross section which is divided into generally coaxial and non-intercommunicating inner and outer compartments by said impermeable elastic sleeve, the inner compartment including an inlet for feed material comprising a mixture of a liquid and a particulate solid to be pressure filtered and the outer compartment including an inlet for a hydraulic fluid under pressue, and in the second position of said tubular bodies said chamber is open to enable the particulate solid material to be discharged from the inner compartment; the improvement which comprises constructing each of the fairings and the ends of the filter cloth sleeve so that each end of the filter cloth sleeve is or can be secured to the outwardly facing surface of one of said fairings.

Each fairing advantageously has an annular groove formed in its outwardly facing surface to enable the ends of the filter cloth sleeve to be secured to the outwardly facing surfaces of the fairings.

Advantageously, the outwardly facing surface of each fairing is shaped so that it has an annulus having an outer surface protruding beyond (extending radially outwardly of) the rest of the surface of the fairing near the inner, or narrow, end of the fairing, and a groove formed in (extending radially inwardly of) the surface of the fairing on that side of the protruding annulus which is furthest from the cylindrical central section of the inner tubular body. The annulus preferably protrudes from 2 to 10 mm radially outwardly of the surface of the fairing; and the groove preferably has a depth of from 2 to 10 mm and a width of from 3 to 15 mm. The end of the filter cloth sleeve can be secured in the groove by binding it with several turns of cord and tying the ends of the cord. The cord preferably has a diameter in the range from 0.5 to 3.0 mm and the number of turns of cord is advantageously from 2 to 10. Other methods of securing the filter cloth sleeve in the groove can also be used such as by means of a wire, an expanding belt, a strap or a clip.

The filter cloth sleeve may also be secured to each fairing by means of a plurality of press studs, screw studs or bayonet studs.

In order to keep the tube pressure filter functioning efficiently it is necessary to change the filter cloth sleeve from time to time. During service the threads of the filter cloth sleeve are damaged by large or abrasive particles in the feed mixture thus widening some of the pores of the filter cloth with the result that the filter cloth becomes less efficient in separating solid particles from the feed mixture and in giving a filtrate substantially free of solid matter. Alternatively, the pores of a filter cloth sleeve may become blinded with trapped solid particles which drastically reduce the rate at which filtrate can pass through the filter cloth sleeve. Hitherto, when the inner tubular body comprises a cylindrical central section, and upper and lower end sections, each of which includes a portion of greater diameter than the cylindrical central section and a fairing which extends around an end of the filter element, it has been necessary in order to change the filter cloth sleeve to remove a substantial part, if not all, of one of the end sections of the inner tubular body, to remove the used filter cloth sleeve, to replace it with a new filter cloth sleeve, and to clamp each end of the new filter cloth sleeve between on the one hand the appropriate fairing and on the other hand the adjacent end of the central cylindrical section and either the lower or upper end section of the inner tubular body. When the inner tubular body is of relatively large diameter this is a time-consuming operation and the components which must be removed are heavy. Therefore it is preferable if the filter element disposed around and supported by the inner tubular body is made in a manner such that or from a material such that it can be drawn over at least one of the end sections of the tube pressure filter. Preferably, therefore, the filter cloth sleeve is made in a manner such that it will stretch over the end sections of the inner tubular body, thus avoiding the need to remove at least one of the end sections in order to change the filter cloth sleeve. One manner of making the filter cloth sleeve so that it can be stretched over the end sections of the inner tubular body is to tailor it from a woven material so that either the warp or the weft filaments of the filter cloth sleeve extend helically around the inner tubular body at a helix angle in the range of from 20° to 70°, preferably 35° to 55°. Most preferably the filter cloth sleeve is tailored so that the warp filaments extend helically around the inner tubular body at a helix angle of about 45°. By tailoring a filter cloth sleeve in this way, it is possible to stretch the filter cloth sleeve transversely of the length thereof and then pull the filter cloth sleeve over an end section of the tube pressure filter. When such a filter cloth sleeve has been drawn over the end section of the inner tubular body the filter cloth sleeve can be stretched along the length of the cylindrical central section of the inner tubular body and secured at each end to retain it in position.

The degree of stretch of a filter cloth sleeve is also influenced by the weight and openness of the weave of the filter cloth. In general, the filter cloth sleeve is preferably woven from a cloth which has a weight of less than 7 oz per square yard. The nature of the cloth does not appear to be important; for example, a 5 oz per square yard polyester cloth seems to perform in the same way as a nylon cloth of the same weight. The amount of stretch which is required depends upon the outer diameter of the cylindrical central section of the inner tubular body. For example, when the diameter of the cylindrical central section of the inner tubular body is relatively small, the degree of stretch required to pull the filter cloth sleeve over the larger end section is very much greater than when the diameter of the cylindrical central section of the inner tubular body is relatively large. This is because the difference between the greatest diameter of the end sections and the outer diameter of the cylindrical central section is substantially the same regardless of the actual diameters so that the percentage elongation required in the case of a small diameter tube pressure filter is much greater than with a large diameter tube pressure filter. After drawing a filter cloth sleeve over the inner tubular body the ends of the sleeve are secured to the outwardly facing surfaces of the fairings in accordance with the invention. The present invention enables a filter cloth sleeve to be fitted without completely removing the inner tubular body from the outer tubular body by adopting the following procedure:

(a) lower the inner tubular body slightly with respect to the outer tubular body;

(b) attach two or more flexible members to one end of a filter cloth sleeve (which is tailored as described above) and pass the flexible members down through the annular cavity between the inner tubular body and the impermeable elastic sleeve;

(c) draw the filter cloth sleeve down over the inner tubular body by means of the flexible members until the lower end of the filter cloth sleeve is located adjacent the lower fairing;

(d) secure the lower end of the filter cloth sleeve to the lower fairing;

(e) remove said flexible members;

(f) raise the inner tubular body slightly to expose the upper end of the filter cloth sleeve;

(g) secure the upper end of the filter cloth sleeve to the upper fairing; and (h) lower the inner tubular body to its normal operative position. The procedure outlined above can be modified by pulling the filter cloth sleeve upwards over the inner tubular body. The flexible members used in the procedure given above may be, for example, tapes, cords, wires, cables, chains or the like.

The filter element will usually include a backing cloth and a wire mesh sleeve (and is preferably constructed as described in British Patent Specification No. 1,317,887), and in this case the wire mesh sleeve and the backing cloth sleeve are also advantageously constructed so that they may be fitted and removed without removing the inner tubular body from the outer tubular body. For example, the wire mesh sleeve can be provided in the form of a rectangular sheet which can be wrapped around the inner tubular body so that the two longer sides meet, and preferably overlap slightly, for example by 1½ inches, to form a cylinder. Most advantageously the material from which the wire mesh sleeve is constructed is annealed so that the cylinder conforms to the shape of the inner tubular body without springiness. The two longer sides of the wire mesh sleeve are conveniently joined with adhesive tape. The backing cloth sleeve may be constructed in a similar way, the two longer sides being joined to form a cylinder by means of a hand stitching machine, adhesive, or adhesive tape. The backing cloth sleeve may be further secured by making a turn of thread around the top end of the sleeve, knotting the ends, winding the thread along the length of the sleeve in a helix, making a second turn of thread around the bottom of the sleeve and again knotting the ends.

For a better understanding of the invention, and to show more clearly how the same may be carried into effect, reference will now be made, by way of example, to the accompanying drawings in which.

Figure 1:
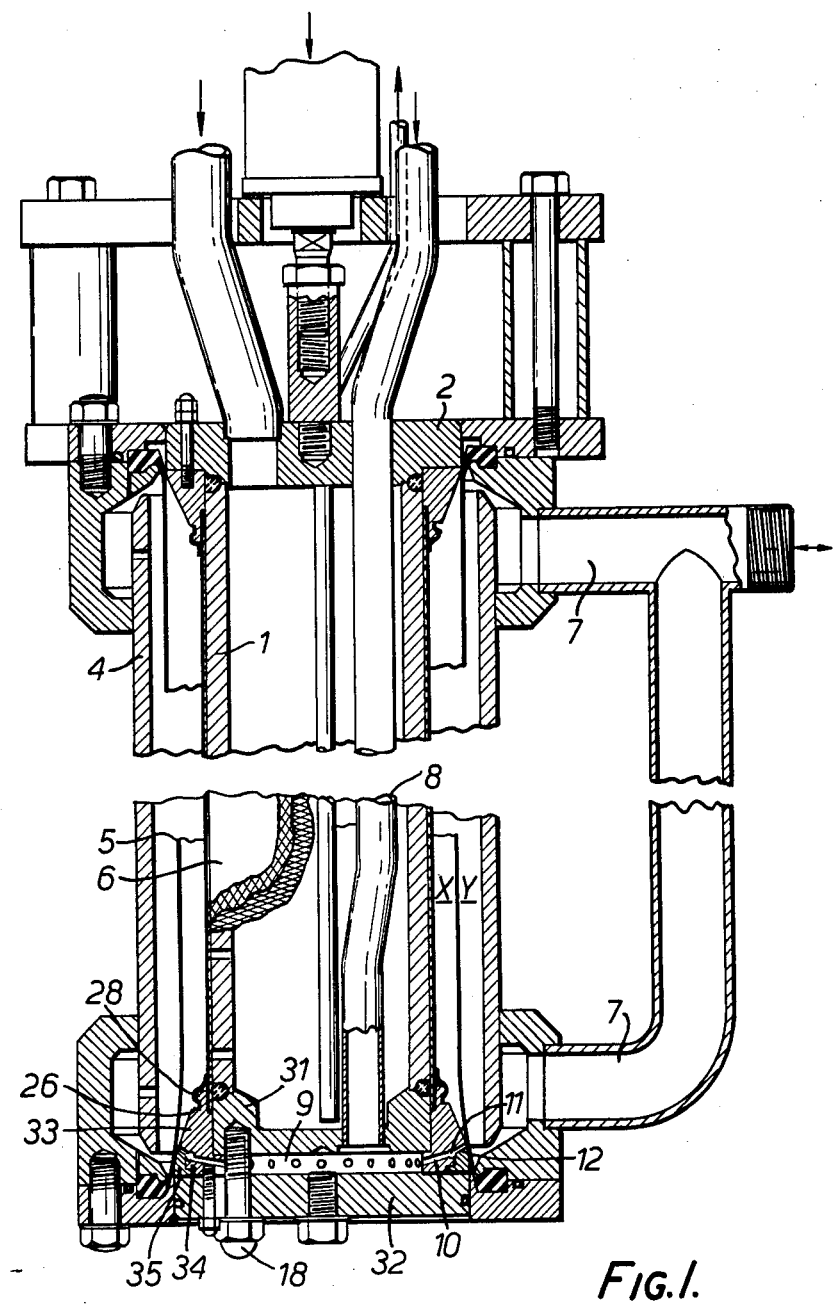
FIG. 1 is a sectional elevation of one embodiment of a tube pressure filter in accordance with the present invention.

Referring now to FIG. 1, there is shown a tube pressure filter whose overall construction and operation is generally in accordance with that of the tube pressure filters described and claimed in British Patent Specifications Nos. 1,240,465 and 1,351,142.

The tube pressure filter comprises an inner tubular body having a cylindrical central section 1, an upper end section 2, and a lower end section which includes an inner cap 31 which is welded to the lower end of the central cylindrical section 1, and an outer cap 32 which is secured to the inner cap 31 by set screws (one of which is shown at 18) but which is spaced therefrom by a ring member 34 which includes a portion constituting a fairing 33. An ante-chamber 9 is defined between the inner cap 31, the outer cap 32 and the ring member 34. A second ring member 35 of approximately L-shaped cross-section fits tightly around an appropriately shaped portion of the ring member 34 and outer cap 32. A feed conduit 8 passes through the inner cap 31, and a feed mixture can flow through the conduit 8 and enter the ante-chamber 9 from where it can pass through a plurality of ducts 10, a toroidal chamber 11 and, finally, through a narrow annular passageway 12 into the inner compartment X of the tube pressure filter.

The tube pressure filter also comprises an outer tubular body 4, an impermeable elastic sleeve 5 secured to the outer tubular body, and a filter element 6 supported on the inner tubular body. The impermeable elastic sleeve 5 divides the annular chamber formed between the inner and outer tubular bodies into non-intercommunicating inner and outer compartments X and Y respectively. The outer compartment Y is provided with an inlet/outlet 7 for hydraulic fluid under pressure. The filter element 6 comprises a filter cloth sleeve which is tailored so that the warp and weft filaments extend helically around the inner tubular body.

Figure 2:
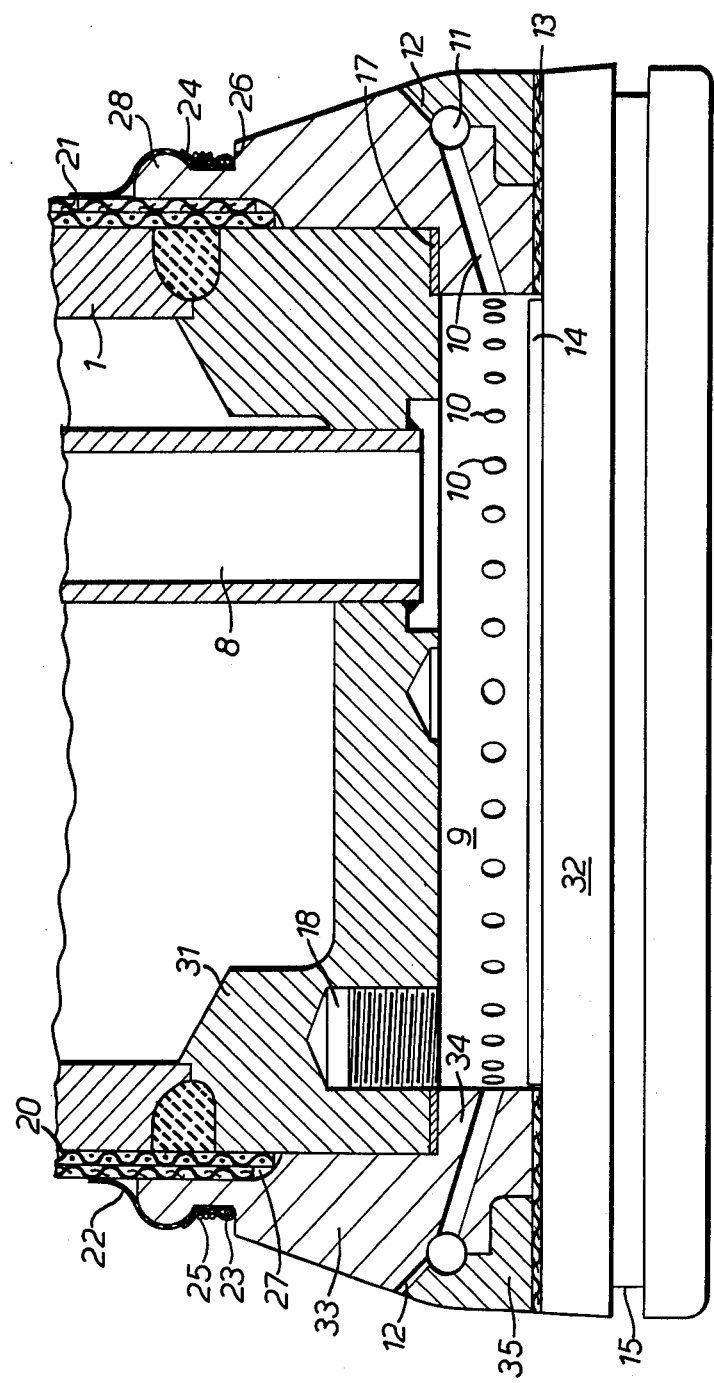
FIG. 2 is a sectional elevation, on an enlarged scale, of the lower end of the inner tubular body of the tube pressure filter of FIG. 1.

FIG. 2 shows in more detail the construction of the lower end of the inner tubular body. The ring member 34 is sandwiched between the inner cap 31 and the outer cap 32, and a sealing ring 17 is provided between the inner cap 31 and the ring member 34. A cloth gasket 13 is provided between the ring members 34 and 35 and the outer cap 32. The narrow annular passageway 12 is formed between the fairing 33 and the ring member 35. The annular passageway is located so that, in use, it is higher than the roof of the ante-chamber 9. The width of the annular passageway 12 conveniently lies in the range of from 0.7 mm to 0.8 mm. The outer cap 32 is provided with a groove 15 to accommodate an O-ring seal for sealing with the outer tubular body of the tube pressure filter, and with a central, circular spigot 14 which locates the outer cap 32 within the ring member 34 and forms the floor of the ante-chamber 9.

In accordance with the present invention, the lower end section of the inner tubular body is constructed so that the upper, or inner, end of the lower fairing 33 is formed with an annular protuberance 28 of increased diameter, and an annular groove 26 just below the annular protuberance 28. A slot 27 is provided between the inner end of the fairing 33 and the central cylindrical section 1 of the inner tubular body.

The upper end section of the inner tubular body is similarly constructed, except that a deeper slot is provided in the upper end section of the inner tubular body. A rectangular sheet of wire mesh 20 is wrapped around the central cylindrical section 1 to form a close fitting cylinder with the two longer sides of the rectangular sheet overlapping slightly. The upper end of the cylinder thus formed is pushed into the slot in the upper end section of the inner tubular body and the lower end of the cylinder is then allowed to drop to the bottom of the slot 27. The overlapping sides of the rectangular sheet are then secured with adhesive tape. A cylinder of coarse weave backing cloth 21 is then formed and fitted to the inner tubular body in a similar manner. Finally, the filter cloth sleeve 22, tailored so that the filaments forming the warp and the weft both make an angle of about 45° with the longitudinal axis of the tubular body, is pulled onto the inner tubular body over the upper end section and is drawn down until the lower end of the filter cloth sleeve extends about 50 mm below the bottom of annular groove 26. Two turns of polyethylene terephthalate cord 23 of diameter 1.5 mm are then wrapped tightly around the outside of the filter cloth sleeve at the level of the bottom of the annular groove 26. The part of the filter cloth sleeve below the two turns of cord is then turned up to form a cuff 24 and a slit is made in the cuff to enable the ends of the cord to be pulled out. Four further turns of the cord 25 are then wrapped tightly around the double thickness of cloth and finally the ends are knotted. The cloth is then secured to the upper end section of the inner tubular body by a similar procedure.

The filter cloth sleeve may be fitted around the central cylindrcal section 1 of the inner tubular body without removing the inner tubular body completely from the outer tubular body by adopting the following procedure:

Four tapes are attached to the lower end of the filter cloth sleeve and weights are provided at the free ends of the tapes. The inner tubular body is then lowered slightly and the weighted tapes are passed down through the annular cavity between the inner tubular body and the elastic sleeve and the filter cloth sleeve thus drawn down over the upper end section of the inner tubular body and secured at the lower end as described above. The tapes are then removed, the inner tubular body raised until the annular groove in the upper fairing (corresponding to groove 26 in the lower fairing) is accessible and the upper end of the filter cloth sleeve is secured in the same manner. Finally the inner tubular body is lowered into the normal operative position.

By following the above procedure it is possible to dispense with the need to raise the inner tubular body right out of the outer tubular body in order to change the filter cloth sleeve and/or the backing cloth and/or wire mesh sleeve. It is therefore unnecessary to provide headroom at least equal to the length of the inner tubular body in the building in which the tube pressure filter is housed. When the procedure described above is used the headroom need only be of the order of one metre.

Instead of securing the end of the filter cloth sleeve by passing two turns of cord round a single thickness of cloth, turning the cloth up to form a cuff, and then passing further turns round the double thickness of cloth, it is possible to tailor the cloth with a ready formed cuff and to pass the turns of cord only round the double thickness of cloth. If desired, a flexible, resilient ring may be sewn into the cuff to help to locate the end of the cloth in the groove 26.

Figure 3:
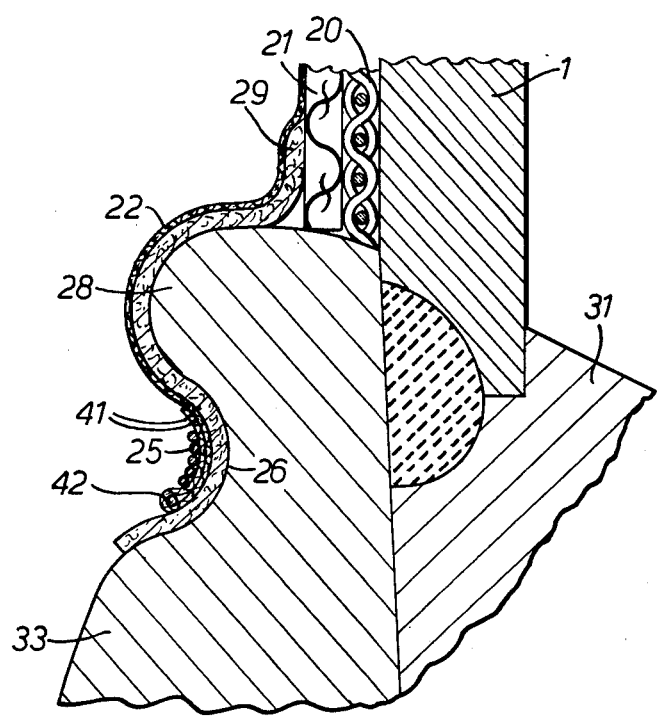
FIG. 3 shows a detail of the lower end section of the inner tubular body of a second embodiment of a tube pressure filter in accordance with the invention.

Referring now to FIG. 3, there is shown a detail of the lower end section of the inner tubular body of a second embodiment of a tube pressure filter in accordance with the invention. FIG. 3 shows the fairing 33 and filter cloth sleeve 22. The annular slot 27 has now been eliminated and the wire mesh sleeve 20 and the backing cloth 21 abut the curved upper edge of the fairing 33. The inner edge of the fairing 33 and the outer edge of the lowest part of the central cylindrical section 1 and the inner end cap 31 are tapered (i.e. the inner diameter of the fairing 33 and the outer diameter of the end cap decrease from top to bottom) to facilitate removal of the fairing. Also the profile of the annular groove 26 has been changed to a more rounded form. The filter cloth sleeve 22 is tailored with a hem which is secured with lines of stitching 41. A narrow slot (not shown) is provided in the hem through which slot a flexible, resilient, split ring 42 is inserted. This ring may be of an elastomeric or a plastics material or may be a metallic wire. Five turns of cord 25 of diameter 1.5 mm are wrapped tightly around the hem of the cloth sleeve 22 and a felt band 29, which is disposed between the fairing 33 and the filter cloth sleeve 22, and the ends of the cord 25 are knotted. The felt band 29 is compressible to enable the turns of cord 25 to be drawn more tightly.

What is claimed is:

1. In a tube pressure filter of the kind which is adapted for high pressure operation and comprises (a) a pair of generally coaxial inner and outer tubular bodies arranged one within the other and adapted to be supported in a generally upright position, the inner tubular body including a cylindrical central section, and upper and lower end sections, each of which end sections includes a portion of greater diameter than the cylindrical central section and a fairing mounted on or adjacent to said portion so as to extend around an end of the cylindrical central section, (b) an impermeable elastic sleeve disposed within and secured to the outer tubular body, (c) a filter element disposed around and supported by the inner tubular body, the filter element comprising a filter cloth sleeve, (d) first outlet means for the discharge from the interior of the inner tubular body of filtrate which has passed through the filter element and through apertures in the inner tubular body, (e) second outlet means for the discharge from the tube pressure filter of particulate solid, and (f) means for displacing the tubular bodies axially relative to one another between a first position and a second position; the arrangement being such that in the first position of said tubular bodies they cooperate with each other to define a closed chamber of annular cross section which is divided into generally coaxial and non-intercommunicating inner and outer compartments by said impermeable elastic sleeve, the inner compartment including an inlet for feed material comprising a mixture of a liquid and a particulate solid to be pressure filtered and the outer compartment including an inlet for a hydraulic fluid under pressure, and in the second position of said tubular bodies said chamber is open to enable the particulate solid material to be discharged from the inner compartment; the improvement which comprises constructing each of the fairings and the ends of the filter cloth sleeve so that each end of the filter cloth sleeve is or can be secured to the outwardly facing surface of one of said fairings, each fairing having an annular groove formed in its outwardly facing surface to enable an end of the filter cloth sleeve to be secured to said outwardly facing surface; said improvement enabling said filter cloth sleeve to be fitted during replacement of a said filter cloth without completely removing said inner tubular body from said outer tubular body, thereby reducing the time consumed in replacing said filter cloth sleeve.

2. A tube pressure filter as claimed in claim 1, wherein the outwardly facing surface of each fairing is shaped so that it has an annulus having an outer surface protruding beyond (extending radially outwardly of) the rest of the surface of the fairing near the inner, or narrow, end of the fairing, and a groove formed in (extending radially inwardly of) the surface of the fairing on that side of the protruding annulus which is furthest from the cylindrical central section of the inner tubular body.

3. A tube pressure filter as claimed in claim 2, wherein said annulus protrudes from 2 mm to 10 mm radially outwardly of the surface of the fairing; and wherein the groove has a depth of from 2 mm to 10 mm and a width of from 3 mm to 15 mm.

4. A tube pressure filter as claimed in claim 1, wherein the ends of the filter cloth sleeve are secured in the annular grooves formed in the fairings by means of cord.

* * * * *